(12) United States Patent
Su et al.

(10) Patent No.: US 11,061,948 B2
(45) Date of Patent: Jul. 13, 2021

(54) METHOD AND SYSTEM FOR NEXT WORD PREDICTION

(71) Applicant: YAHOO HOLDINGS, INC., Sunnyvale, CA (US)

(72) Inventors: Hang Su, Washington, DC (US); Hongbo Deng, Sunnyvale, CA (US); Kazuhiro Nakao, Sunnyvale, CA (US); Shenhong Zhu, Santa Clara, CA (US)

(73) Assignee: Verizon Media Inc., New York, NY (US)

( * ) Notice: Subject to any disclaimer, the term of this patent is extended or adjusted under 35 U.S.C. 154(b) by 1092 days.

(21) Appl. No.: 15/272,636

(22) Filed: Sep. 22, 2016

(65) Prior Publication Data

US 2018/0081964 A1 Mar. 22, 2018

(51) Int. Cl.
*G06F 40/274* (2020.01)
*G06F 16/338* (2019.01)
*G06F 16/31* (2019.01)
*G06F 16/33* (2019.01)

(52) U.S. Cl.
CPC .......... *G06F 16/338* (2019.01); *G06F 16/313* (2019.01); *G06F 16/3331* (2019.01); *G06F 40/274* (2020.01)

(58) Field of Classification Search
CPC combination set(s) only.
See application file for complete search history.

(56) References Cited

U.S. PATENT DOCUMENTS

| | | | |
|---|---|---|---|
| 9,075,898 B1* | 7/2015 | Ayzenshtat | G06F 16/3322 |
| 2013/0013580 A1* | 1/2013 | Geller | G06F 16/285 |
| | | | 707/706 |
| 2015/0370805 A1* | 12/2015 | Jain | G06F 16/958 |
| | | | 707/730 |
| 2016/0224524 A1* | 8/2016 | Kay | G06F 3/0236 |

* cited by examiner

*Primary Examiner* — Tuankhanh D Phan
(74) *Attorney, Agent, or Firm* — Pillsbury Winthrop Shaw Pittman LLP

(57) ABSTRACT

A method implemented on a computing device having at least one processor, storage, and a communication platform connected to a network for predicting a next word comprises generating a suggestion database including a plurality of suggestions; receiving an input from a user including a first word and at least one character of a second word; obtaining one or more indices associated with the at least one character from the suggestion database; retrieving one or more suggestions corresponding to the one or more indices from the suggestion database; and presenting the one or more suggestions to the user.

20 Claims, 11 Drawing Sheets

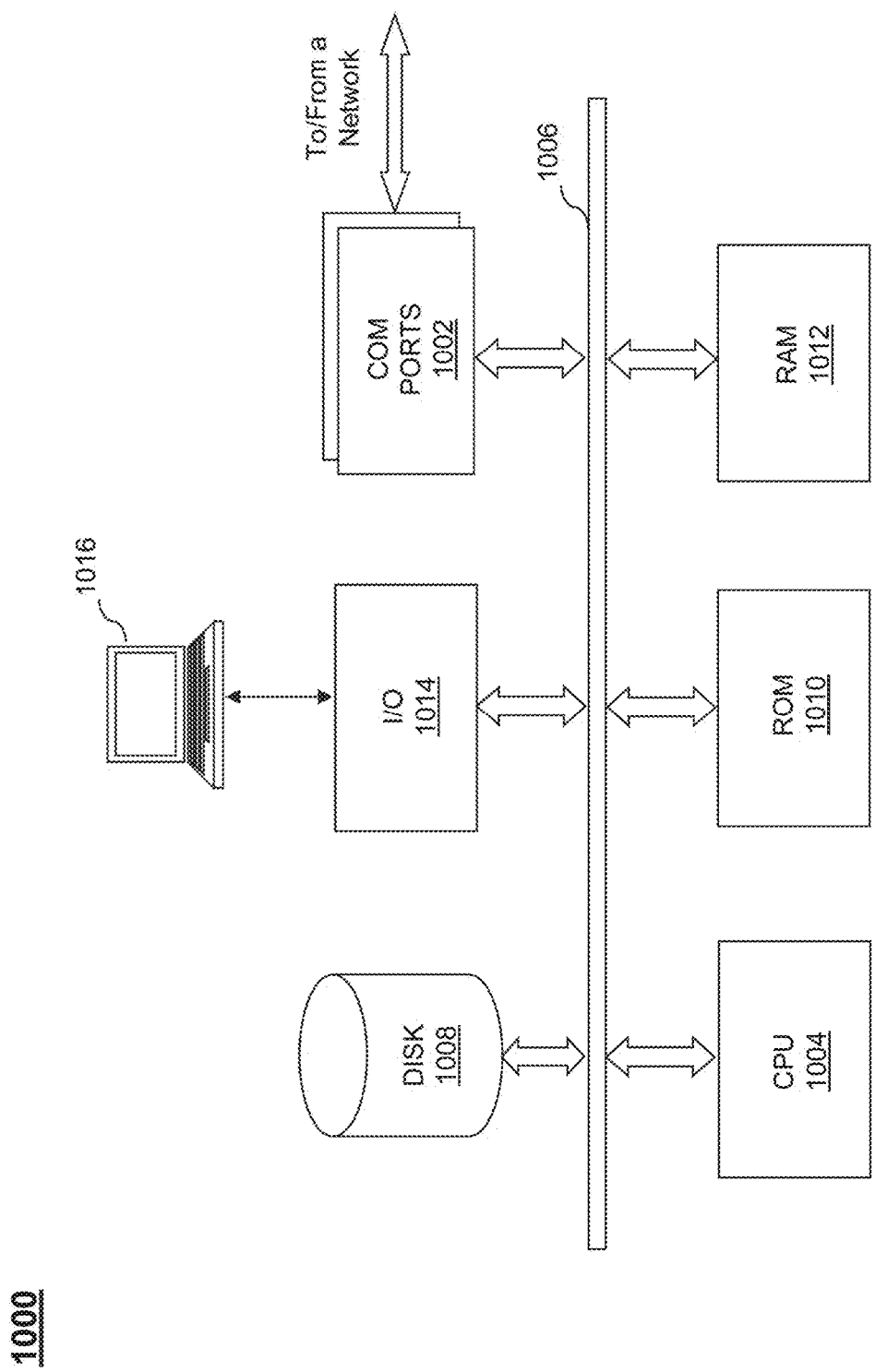

METHOD AND SYSTEM FOR NEXT WORD PREDICTION

BACKGROUND

1. Technical Field

The present teaching relates to method, system and programming for next word prediction. In particular, the present teaching relates to method, system, and programming for next word prediction with N-gram language model.

2. Discussion of Technical Background

Next word prediction is widely used in internet search, content recommendation, and other related applications. One or more next words are predicted based on a partial input of a last word. If the last word is not given, it is treated as an empty partial prefix of the last word. Language models are applied to find one or more next word candidates that match the partial prefix of the last word and filter out the least related candidates based on conditional probabilities. The process of filtering the least related candidates includes evaluation of all next word candidates given the words user already typed, which can be as large as thousands of next word candidates. As the user dynamically inputs the words, evaluating the large amount of next word candidates in real-time before providing meaningful suggestions to the user is time cumbersome and inefficient.

Therefore, there is a need to provide a solution to efficiently provide next word suggestions based on the user's partial input in real-time to tackle the above-mentioned challenges.

SUMMARY

The present teaching relates to method, system and programming for next word prediction. In particular, the present teaching relates to method, system, and programming for next word prediction with N-gram language model.

According to an embodiment of the present teaching, a method implemented on a computing device having at least one processor, storage, and a communication platform connected to a network for predicting a next word comprises generating a suggestion database including a plurality of suggestions; receiving an input from a user including a first word and at least one character of a second word; obtaining one or more indices associated with the at least one character from the suggestion database; retrieving one or more suggestions corresponding to the one or more indices from the suggestion database; and presenting the one or more suggestions to the user.

According to another embodiment of the present teaching, a system having at least one processor, storage, and a communication platform connected to a network for predicting a next word comprises a suggestion database generating engine implemented on the at least one processor and configured to generate a suggestion database including a plurality of suggestions; a user interface implemented on the at least one processor and configured to receive an input from a user including a first word and at least one character of a second word; an index retriever implemented on the at least one processor and configured to obtain one or more indices associated with the at least one character from the suggestion database; a suggestion retriever implemented on the at least one processor and configured to retrieve one or more suggestions corresponding to the one or more indices from the suggestion database; and a presenting module implemented on the at least one processor and configured to present the one or more suggestions to the user.

According to another embodiment of the present teaching, a non-transitory machine-readable medium having information recorded thereon for predicting a next word, wherein the information, when read by the machine, causes the machine to perform the following: generating a suggestion database including a plurality of suggestions; receiving an input from a user including a first word and at least one character of a second word; obtaining one or more indices associated with the at least one character from the suggestion database; retrieving one or more suggestions corresponding to the one or more indices from the suggestion database; and presenting the one or more suggestions to the user.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 10 depicts a general computer architecture on which the present teaching can be implemented.

DETAILED DESCRIPTION

Figure 1:
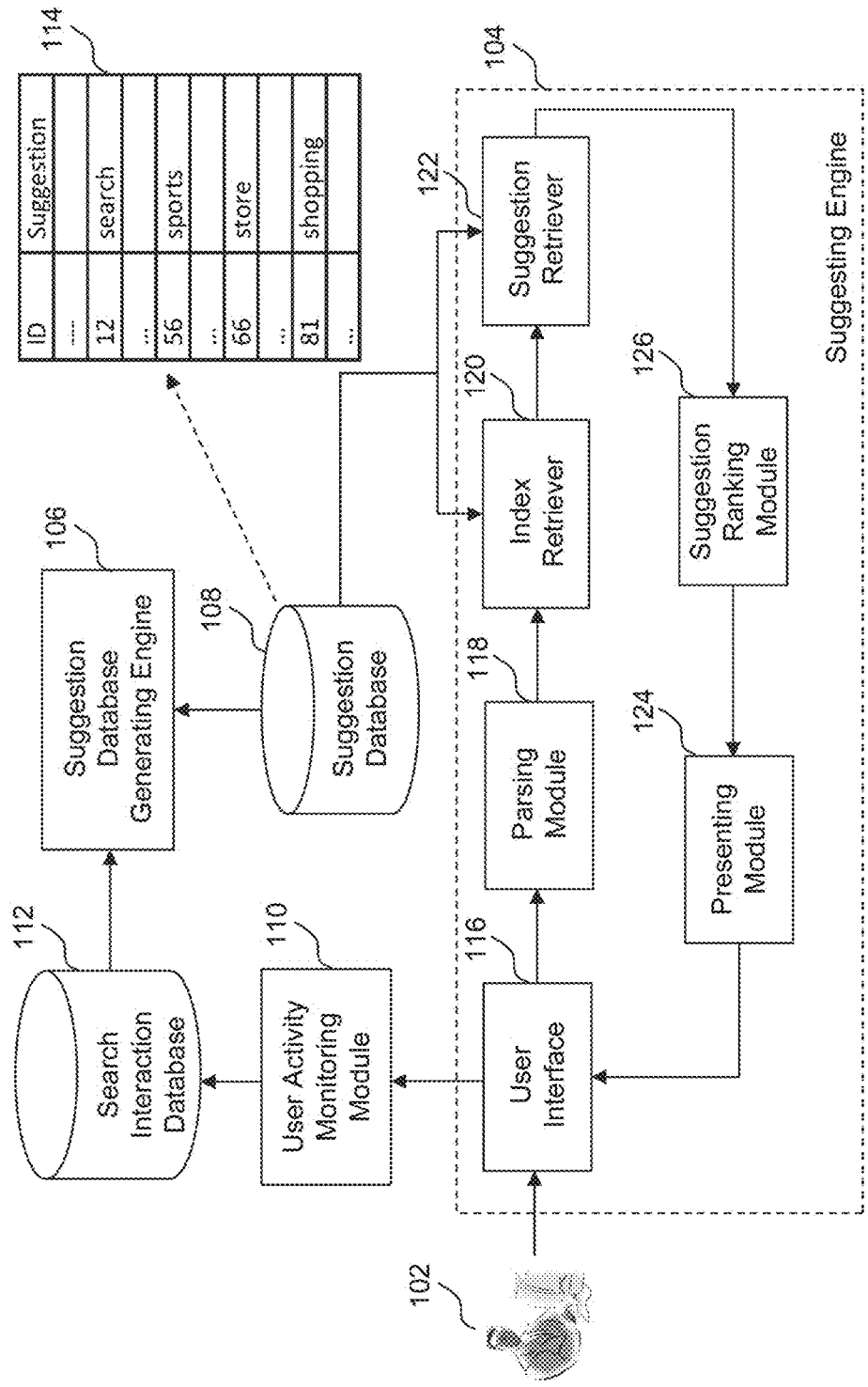
FIG. 1 illustrates an exemplary system diagram of next word prediction, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present teaching pre-generates a suggestion database using an N-gram language model. Given a fixed corpus data, the N-gram language model is fixed and determined. Therefore, for a given context C (i.e., parts of a written statement that precede or follow a specific word or passage) and a next word candidate $W_i$, the conditional probability $P(W_i|C)$ is also fixed. As all potential candidate probabilities are fixed, the highest ranked candidates can be determined and saved as potential suggestions. The present teaching generates the prediction results for each possible context from the corpus data and stores the results in the suggestion database during offline data mining phase. At runtime, the results can be directly retrieved if the context can be found in the database, and as such, expensive computation can be avoided. Further, since the suggestion database is generated based on a fixed-size corpus and certain filtering conditions are applied to reduce the size to improve the quality of the generated N-gram language model, the number of contexts covered by the generated N-gram language model is therefore limited.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 illustrates an exemplary system diagram of next word prediction, according to an embodiment of the present teaching. The system of next word prediction 100 comprises a suggesting engine 104, a suggestion database generating engine 106, a suggestion database 108, a user activity monitoring module 110, and a search interaction database 112. Suggesting engine 104 receives user inputs from user 102. When the user inputs are determined to be a search query comprising one or more words and a partial prefix of a last word, suggesting engine 104 retrieves one or more candidate suggestions from suggestion database 108 and presents the one or more candidate suggestions to the user. According to the present teaching, each of the one or more candidate suggestions includes the one or more words already inputted by the user and a predicted last word that matches the partial prefix inputted by the user. When the user inputs are determined to subsequent activities to the provided one or more candidate suggestions, such as, selecting one search query suggestion or the recommended content, the user's activities are automatically captured by user activity monitoring module 110 and stored in search interaction database 112.

Suggesting engine 104 may comprise a user interface 116, a parsing module 118, an index retriever 120, a suggestion retriever 122, a presentation module 124, and a suggesting ranking module 126. User interface 116 receives all types of user input from user 102, for example, a user's typing in characters in a search box embedded in an internet explorer and/or an application, a user's selection of a search suggestion or content recommendation, a user's moving or dragging an item on the displayed content page, a user's zooming in or out of an item on the displayed content page, a user's interaction with various social media sources, etc. User interface 116 is capable of determining the user's intended activities and forwarding the user inputs to different processing modules based on the determined user activities or the intended activities. For example, if a user types "Yahoo! s" in the search box, user interface 116 determines that the user may want to search content related to a phrase starting with "Yahoo! s" and forwards "Yahoo! s" to parsing module 118. In another example, if the user is provided with one or more search suggestions based on the inputted "Yahoo! s," such as "Yahoo! sports," "Yahoo! stock," and "Yahoo! shopping," and the user selects "Yahoo! stock," user interface 116 determines that the user interacts with the suggested queries and forwards the user interactions to user activity monitoring module 110.

Parsing module 118 is configured to analyze the user input and break down the user input into different components including meaningful words, symbols, letters/characters that appear to be a partial prefix of a last word, etc. Index retriever 120 is configured to search an index table 114 stored in suggestion database 108 and identify one or more indexes that match the partial prefix. For example, if the partial prefix of the last word of the user input is "s," index retriever 120 identifies four indices related to the partial prefix: 12, 56, 66 and 81 as shown in index table 114. In another example, if the partial prefix of the last word of the user input is "se," index retriever 120 identifies one index 12 related to the partial prefix. Suggestion retriever 122 receives the one or more indexes from index retriever 120 and obtains one or more pre-generated suggestions corresponding to the one or more indexes from suggestion database 108. Suggestion ranking module 126 is configured to rank the one or more pre-generated suggestions based on a criteria. The ranking criteria may be the frequency that a suggestion is recommended with the same previous word, the frequency that a suggestion received interactions from the specific user or a specific group of users, the frequency that a suggestion is recommend with respect to a particular topic, the frequency that a suggestion is recommended within a time frame, the frequency that a suggestion is recommended within a geographic area, etc. Presenting module 124 receives the ranked one or more suggestions and presents them to the user on user interface 116. It should be appreciated that the examples of ranking criteria is for illustrative purpose. The present teaching is not intended to be limiting.

User activity monitoring module 110 is configured to monitor user activities via user interface 116 and automatically collect the real-time information. Such information is forwarded to search interaction database 112 for storage. Suggestion database generating engine 106 is configured to analyze information stored in search interaction database 112 and pre-generate a plurality of suggestions for search or content recommendation.

Figure 2:
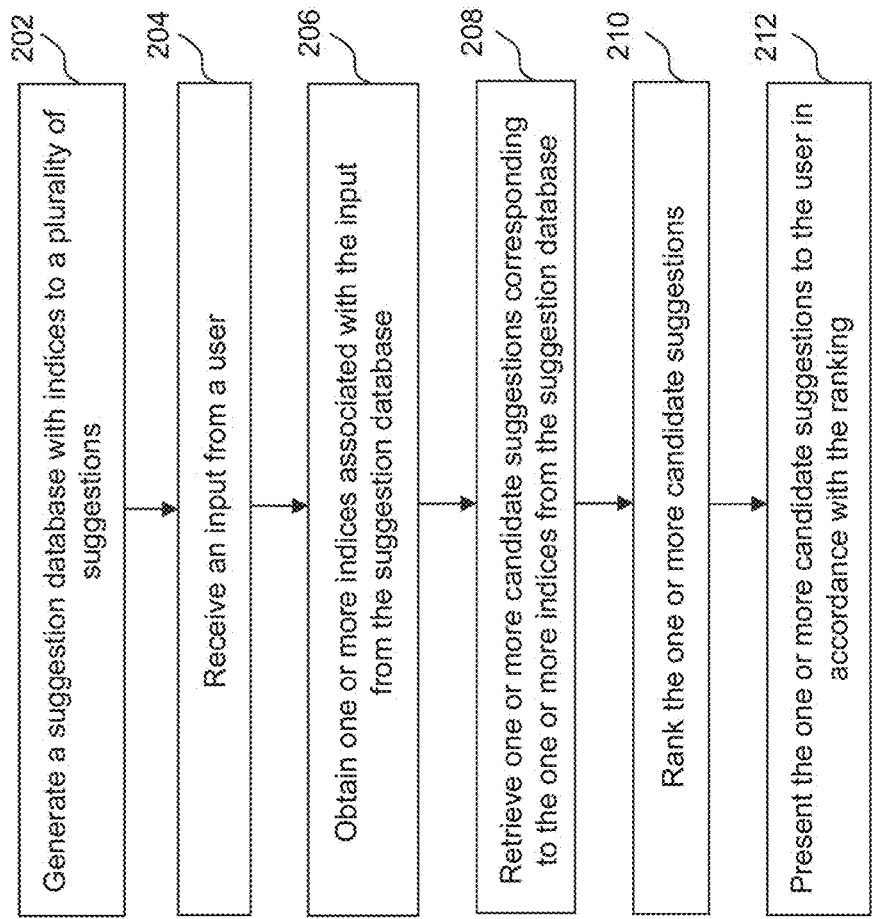
FIG. 2 illustrates an exemplary flowchart of next word prediction, according to an embodiment of the present teaching.

FIG. 2 illustrates an exemplary flowchart of next word prediction, according to an embodiment of the present teaching. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 2 and described below is not intended to be limiting.

At operation 202, a suggestion database including indices to a plurality of suggestions is generated. In some embodiments, operation 202 is performed by a suggestion database generating engine the same as or similar to suggestion database generating engine 106 shown in FIG. 1 and described herein. At operation 204, an input is received from a user. In some embodiments, operation 204 is performed by a user interface the same as or similar to user interface 116 shown in FIG. 1 and described herein. At operation 206, one or more indices associated with the input from the suggestion database are obtained. In some embodiments, operation 206 is performed by an index retriever the same as or similar to index retriever 120 shown in FIG. 1 and described herein. At operation 208, one or more candidate suggestions corresponding to the one or more indices are retrieved from the suggestion database. In some embodiments, operation 208 is performed by a suggestion retriever the same as or similar to suggestion retriever 122 shown in FIG. 1 and described herein. At operation 210, the one or more candidate suggestions are ranked. In some embodiments, operation 210 is performed by a suggestion ranking module the same as or similar to suggestion ranking module 126 shown in FIG. 1 and described herein. At operation 212, the one or more candidate suggestions are presented to the user in accordance with the ranking. In some embodiments, operation 212 is performed by a presenting module the same as or similar to presenting module 124 shown in FIG. 1 and described herein.

Figure 3:
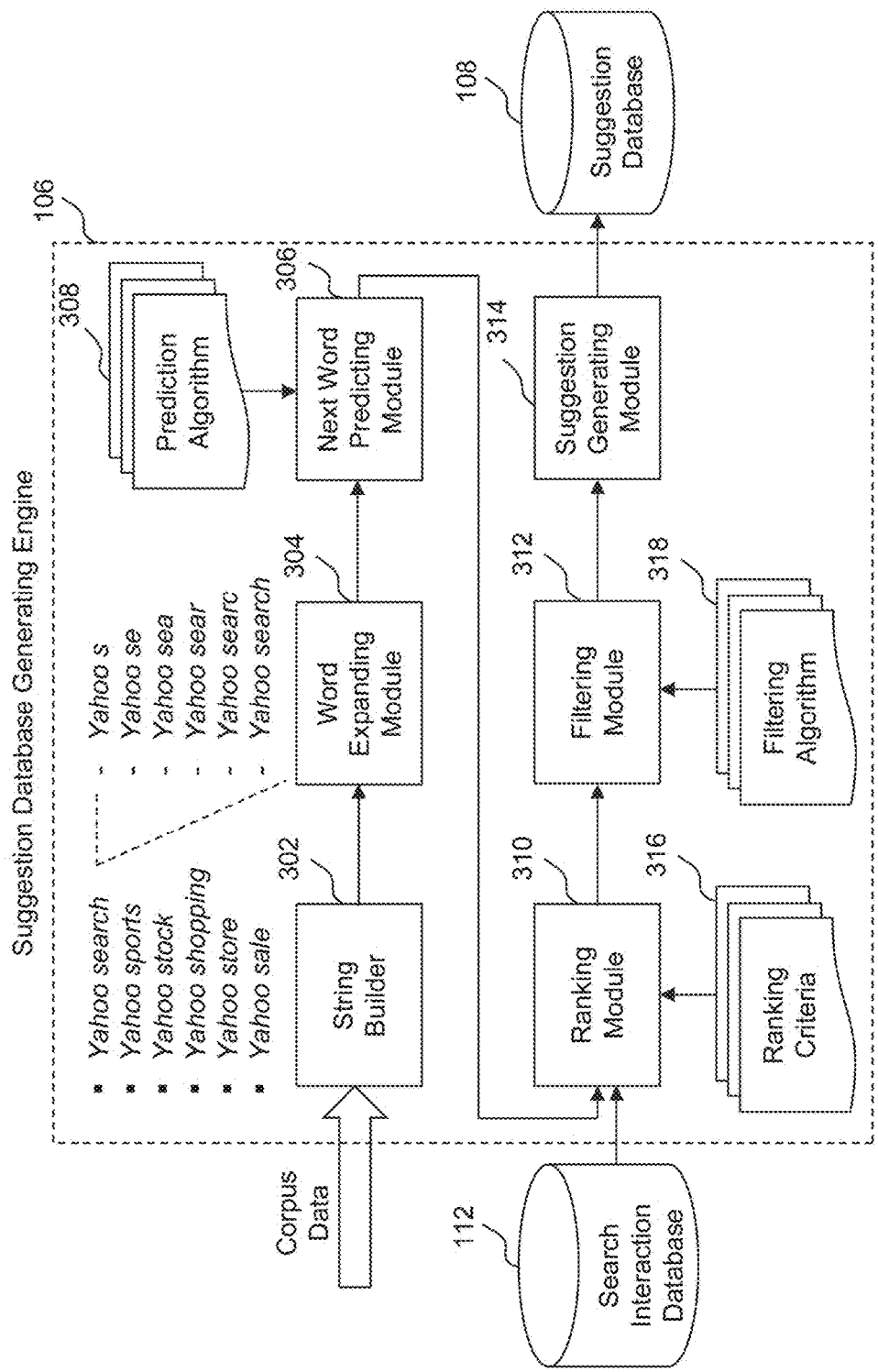
FIG. 3 illustrates an exemplary system diagram of a suggestion database generating engine, according to an embodiment of the present teaching.

FIG. 3 illustrates an exemplary system diagram of a suggestion database generating engine, according to an embodiment of the present teaching. Suggestion database generating engine 106 shown in FIG. 1 may comprise a string builder 302, a word expanding module 304, a next word predicting module 306, a ranking module 310, a filtering module 312, and a suggestion generating module 314. String builder 302 is configured to construct a plurality of strings from the received corpus data. The string according to the present teaching is a complete string of search key words, for example, Yahoo search, Yahoo sports, Yahoo stocks, etc. Word expanding module 304 is configured to expand the last word of the string to a set of items. Each of the set of items is a partial prefix of the last word. The dimension of the set of items is equivalent to a number of characters of the last word, and each of the set of items has one character more than a previous one in the set of items. For example, the last word of the string "Yahoo search" is expanded to a set of items including: s, se, sea, sear, searc, and search. In some embodiments, N-gram language model is applied to determine all possible combinations of contexts, where N can be any integer equal to or greater than 2 (e.g., N=2, 3, 4, . . . ).

Next word predicting module 306 is configured to predict one or more next words that match set of items, i.e., the partial prefixes. For each of the set of items, any next word prediction algorithm 308 with the language model as input can be applied to generate a pre-determined number of results. Prediction algorithm 308 can be any state-of-art method utilizing the language model, which can use, but not limited to, any smoothing and back-off technique. Next word predicting module 306 scans all possible candidates from the N-gram language model matching the partial prefix of the last word. For each candidate, next word predicting module 306 estimates a probability based on the language model. Ranking module 310 further ranks the candidates based on the estimated probabilities. The estimated probabilities indicate prediction scores associated with the candidates. In some embodiments, the estimated probabilities are the language model prediction probabilities. In another embodiment, the estimated probabilities are scores generated from any combination of ranking methods. Ranking module 310 may apply one or more ranking criteria 316 to estimate the probabilities, such as, the frequency that the candidate is recommended with the same previous word, etc. In some embodiments, ranking criteria 316 may be the same or similar to those criteria adopted by suggesting ranking module 126 shown in FIG. 1. Filtering module 312 is configured to prune the ranked candidates and select the candidates with the K highest probabilities, wherein K is a pre-determined value. Filtering module 312 may use any filtering algorithm 318, such as fixed threshold-based filtering. Suggesting generating module 314 receives the filtered candidates and generates a list of suggestions to be stored in suggestion database 108.

Figure 4:
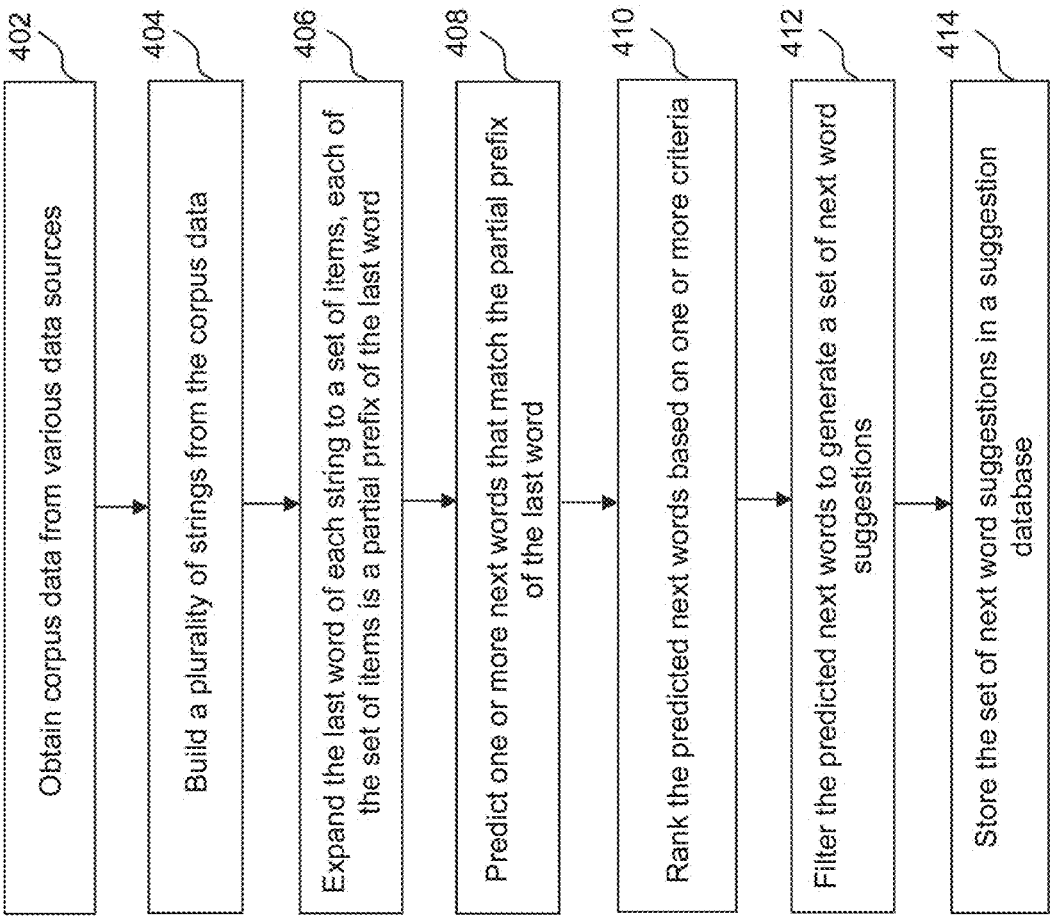
FIG. 4 illustrates an exemplary flowchart of generating the suggestion database, according to an embodiment of the present teaching.

FIG. 4 illustrates an exemplary flowchart of generating the suggestion database, according to an embodiment of the present teaching. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 4 and described below is not intended to be limiting.

At operation 402, corpus data is obtained from various data sources. In some embodiments, operation 402 is performed by a string builder the same as or similar to string builder 302 shown in FIG. 3 and described herein. At operation 404, a plurality of strings is built from the corpus data. In some embodiments, operation 404 is performed by a string builder the same as or similar to string builder 302 shown in FIG. 3 and described herein. At operation 406, the last word of each string is expanded to a set of items, where each of the set of items is a partial prefix of the last word. In some embodiments, operation 406 is performed by a word expanding module the same as or similar to word expanding module 304 shown in FIG. 3 and described herein. At operation 408, one or more next words that match the partial prefix of the last word are predicted. In some embodiments, operation 408 is performed by a next word predicting module the same as or similar to next word predicting module 306 shown in FIG. 3 and described herein. At operation 410, the predicted next words are ranked based on one or more criteria. In some embodiments, operation 410 is performed by a ranking module the same as or similar to ranking module 310 shown in FIG. 3 and described herein.

At operation 412, the predicted next words are filtered to generate a set of next word suggestions. In some embodiments, operation 412 is performed by a suggestion generating module the same as or similar to suggestion generating module 314 shown in FIG. 3 and described herein. At operation 414, the set of next word suggestions are stored in a suggestion database. In some embodiments, operation 414 is performed by a suggestion generating module the same as or similar to suggestion generating module 314 shown in FIG. 3 and described herein.

Figure 5:
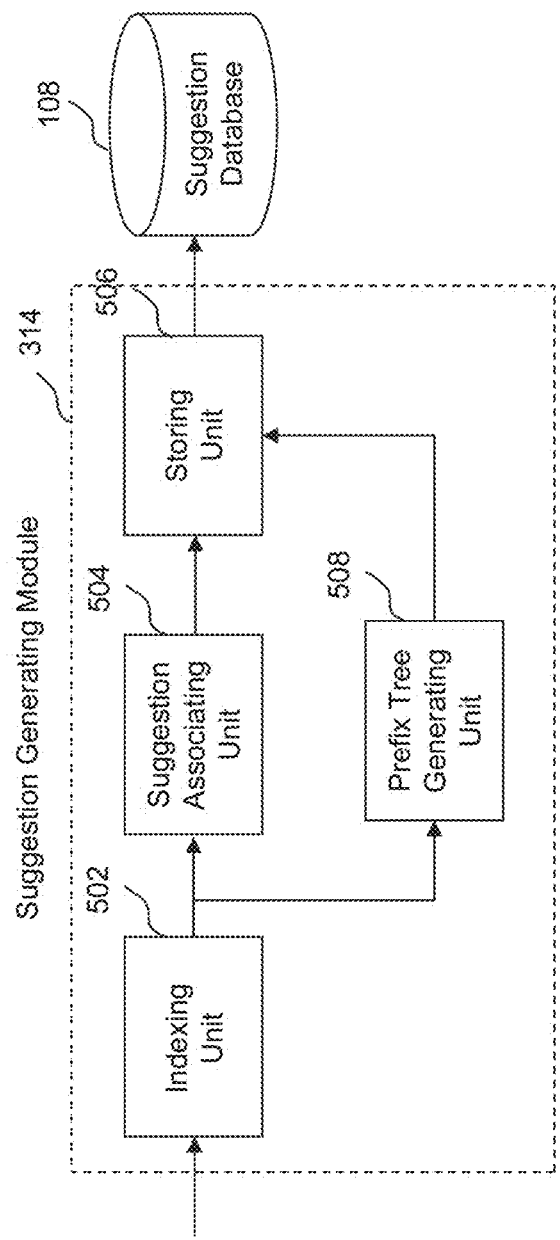
FIG. 5 illustrates an exemplary system diagram of a suggestion generating module, according to another embodiment of the present teaching.

FIG. 5 illustrates an exemplary system diagram of a suggestion generating module, according to another embodiment of the present teaching. When all possible suggestion candidates are built into the suggestion database, any duplicate suggestion candidates are removed from storage. However, the number of duplicate appearances of the suggestion candidates is used to sort the stored suggestion candidates in descending order (i.e., suggestion candidates with highest number of appearances are put in front of the suggestion database). Suggestion generating module 314 shown in FIG. 3 comprise an indexing unit 502, a suggesting associating unit 504, a storing unit 506, and a prefix tree generating unit 508. Indexing unit 502 is configured to assign a unique ID to each suggestion, starting from 0, increment by 1 for each additional suggestion in the database. Suggestion associating unit 504 is configured to associate additional attributes with the suggestions for presentation or other purposes. Such attributes may include frequencies of the suggestion being retrieved, topics related to the suggestions, trend the suggestion being retrieved during a time period, etc. Prefix tree generating unit 508 is configured to generate a prefix tree for each string including the predicted next word. Each letter or symbol of the string is inserted into the prefix tree. The final node of the prefix tree is associated with an inverted index list, containing the suggestion database IDs of the corresponding suggestions. In some embodiments, prefix tree generating unit 508 may use any state-of-art implementation and/or compression techniques. Storing unit 506 receives the index information, association information, and the prefix trees associated with the suggestions to be stored in suggestion database 108.

Figure 6A:
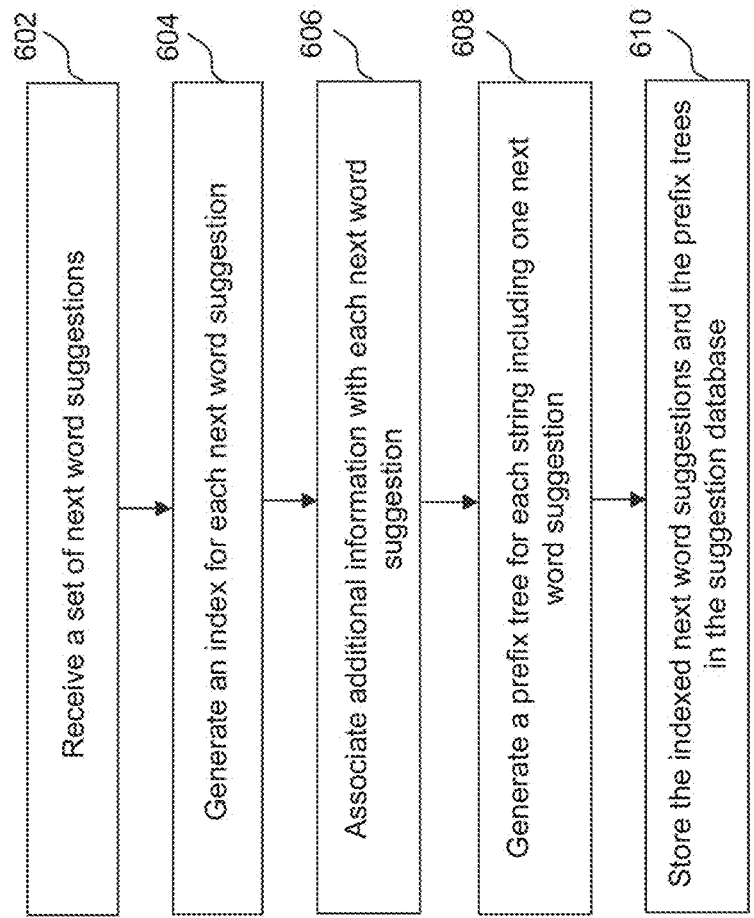
FIG. 6A illustrates an exemplary flowchart of generating the suggestion database, according to another embodiment of the present teaching.

FIG. 6A illustrates an exemplary flowchart of generating the suggestion database, according to another embodiment of the present teaching. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 6A and described below is not intended to be limiting.

At operation 602, a set of next word suggestions is received. In some embodiments, operation 602 is performed by an indexing unit the same as or similar to index unit 502 shown in FIG. 5 and described herein. At operation 604, an index is generated for each next word suggestion. In some embodiments, operation 604 is performed by an indexing unit the same as or similar to index unit 502 shown in FIG. 5 and described herein. At operation 606, additional information is associated with each next word suggestion. In some embodiments, operation 606 is performed by a suggestion associating unit the same as or similar to suggestion associating unit 504 shown in FIG. 5 and described herein. At operation 608, a prefix tree is generated for each string including one next word suggestion. In some embodiments, operation 608 is performed by a prefix tree generating module the same as or similar to prefix tree generating module 508 shown in FIG. 5 and described herein. At operation 610, the indexed next word suggestions and the prefix trees are stored in the suggestion database. In some embodiments, operation 610 is performed by a storing unit the same as or similar to storing unit 506 shown in FIG. 5 and described herein.

Figure 6B:
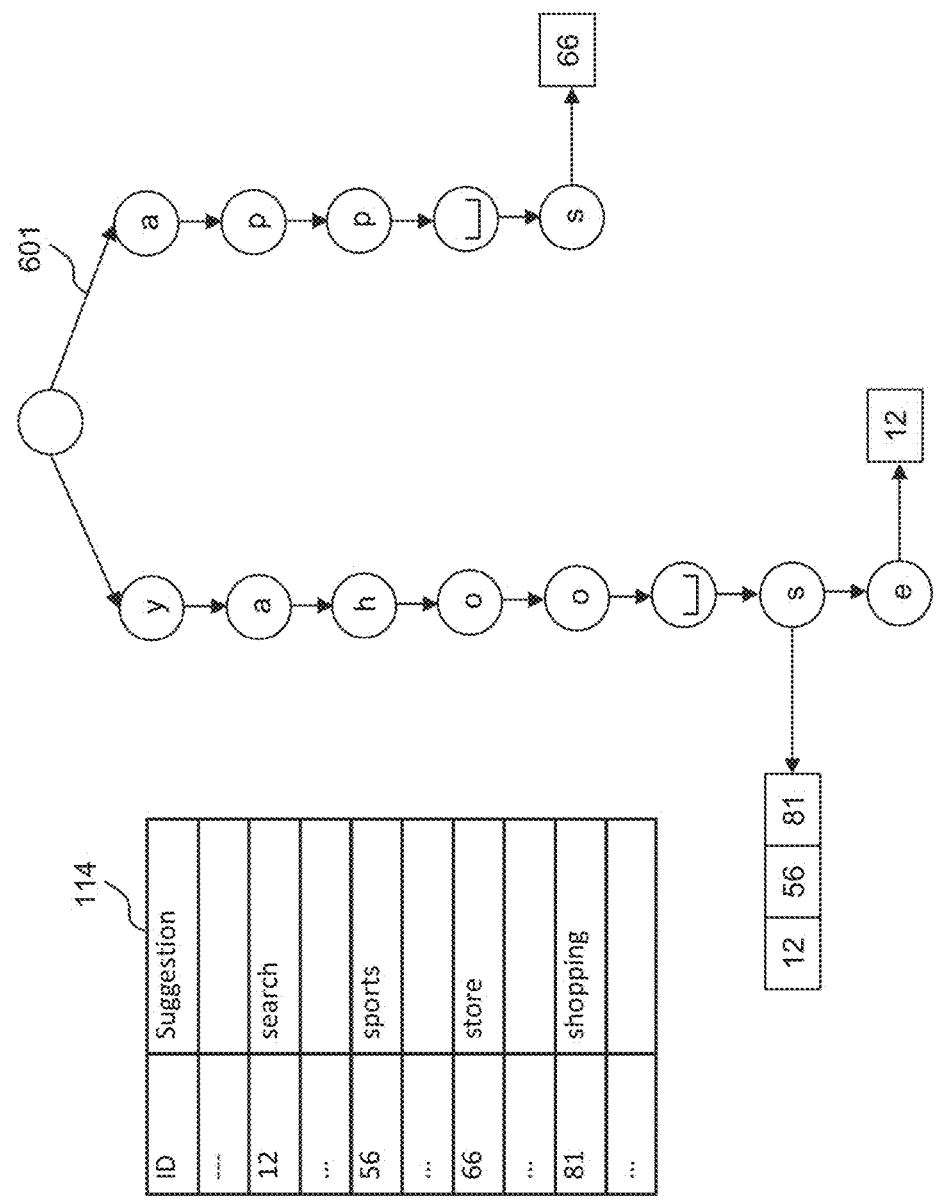
FIG. 6B illustrates an exemplary prefix tree and index table of the suggestion database, according to an embodiment of the present teaching.

FIG. 6B illustrates an exemplary prefix tree and index table of the suggestion database, according to an embodiment of the present teaching. In the illustrated example, index table 114 includes suggestions {search, sports, store, shopping} being assigned with ID {12, 56, 66, 81}, respectively. Three prefixes are shown in prefix tree 601 including yahoo s, yahoo se, and app s. For prefix yahoo s, suggestion IDs are retrieved as 12, 56, and 81; fore prefix yahoo se, suggestion ID is retrieved as 12; and for prefix app s, suggestion ID is retrieved as 66. It should be appreciated that the above examples of the index table and the prefix tree are for illustrative purpose. The present teaching is not intended to be limiting.

Figure 7:
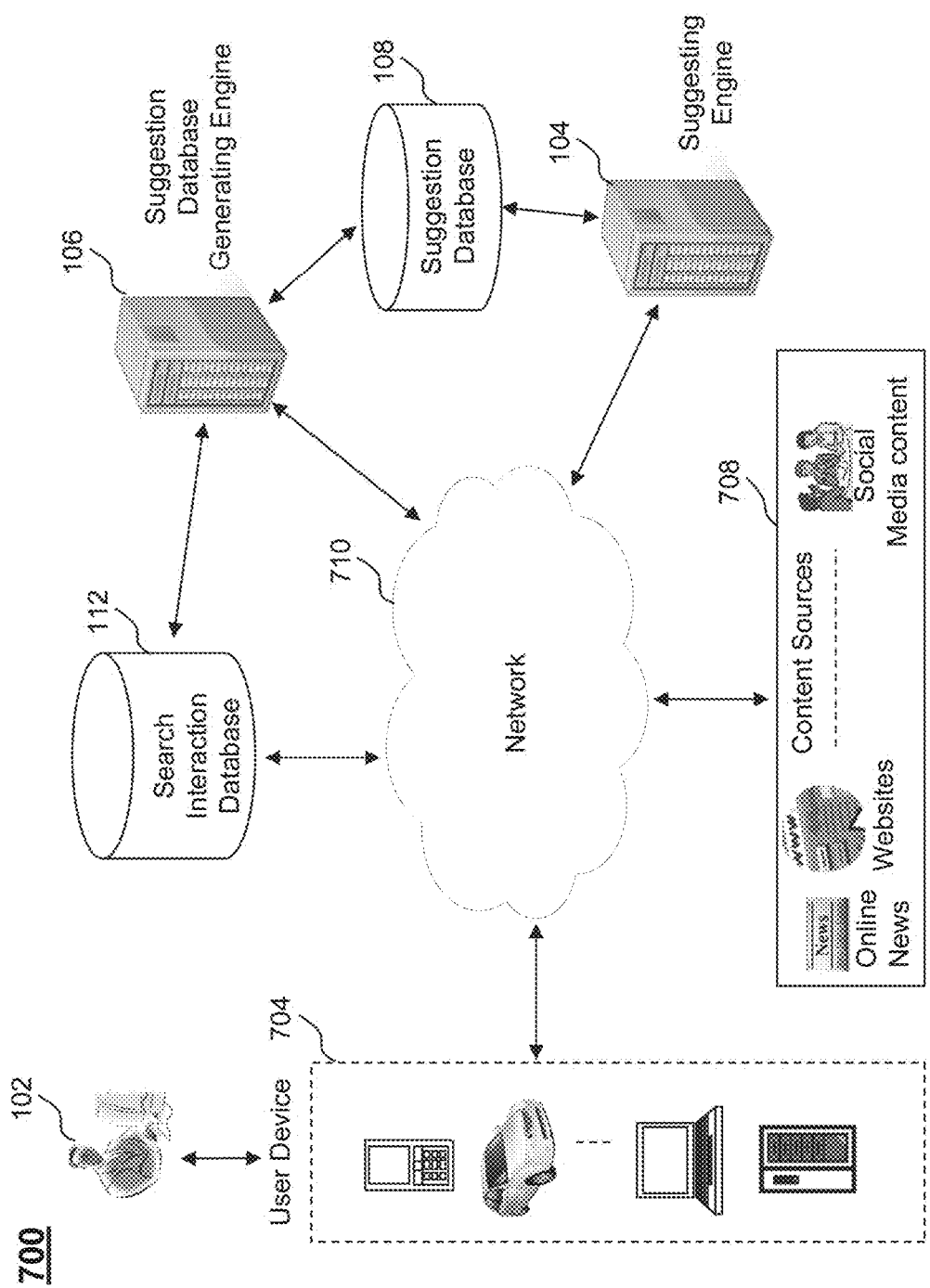
FIG. 7 illustrates a network environment of next word prediction, according to an embodiment of the present teaching.

FIG. 7 illustrates a network environment of next word prediction, according to an embodiment of the present teaching. The exemplary networked environment 700 includes user 102, one or more user devices 704, one or more content sources 708, network 710, a suggestion database generating engine 106, a suggesting engine 104, a suggestion database 108, and a search interaction database 112. One or more user devices 704 are connected to network 710 and include different types of terminal devices including but not limited to desktop computers, laptop computers, a built-in device in a motor vehicle, or a mobile device. The content resource 708 may correspond to a website hosted by an entity, whether an individual, a business, or an organization such as USPTO.gov, a content provider such as cnn.com and Yahoo.com, a social network website such as Facebook.com, or a content feed source such as tweeter or blogs. Network 710 may be a single network or a combination of different networks. For example, the network 710 may be a local area network (LAN), a wide area network (WAN), a public network, a private network, a proprietary network, a Public Telephone Switched Network (PSTN), the Internet, a wireless network, a virtual network, or any combination thereof. Network 710 may also include various network access points, e.g., wired or wireless access points such as base stations or Internet exchange points, through which a data source may connect to the network 710 in order to transmit information via the network 710. Suggestion database generating engine 106 periodically retrieves information from one or more content sources 708 and search interaction database 112, and uses the information as corpus data input to generate suggestion database 108. In some embodiments, suggestion database generating engine 106 may automatically update suggestion database 108 upon receiving real-time updates from search interaction database 112. Suggesting engine 104 monitors user activities in the internet and automatically provides the user with search suggestions or content recommendations based on the pre-generated suggestions.

Figure 8:
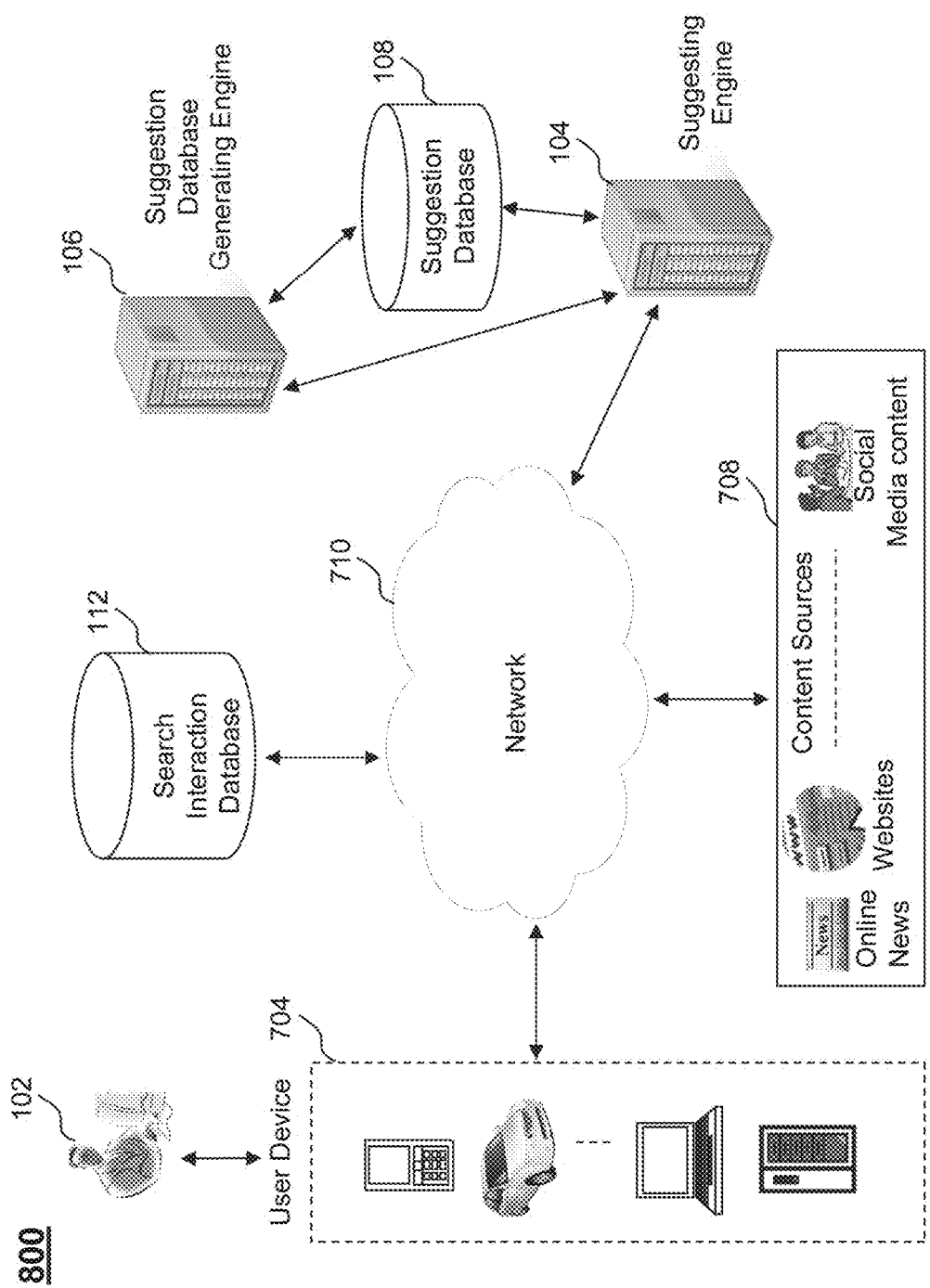
FIG. 8 illustrates a network environment of next word prediction, according to another embodiment of the present teaching.

FIG. 8 illustrates a network environment of next word prediction, according to another embodiment of the present teaching. The networked environment 800 in this embodiment is similar to the networked environment 700 in FIG. 7, except that suggestion database generating engine 106 acts as a back-end engine to suggesting engine 104.

Figure 9:
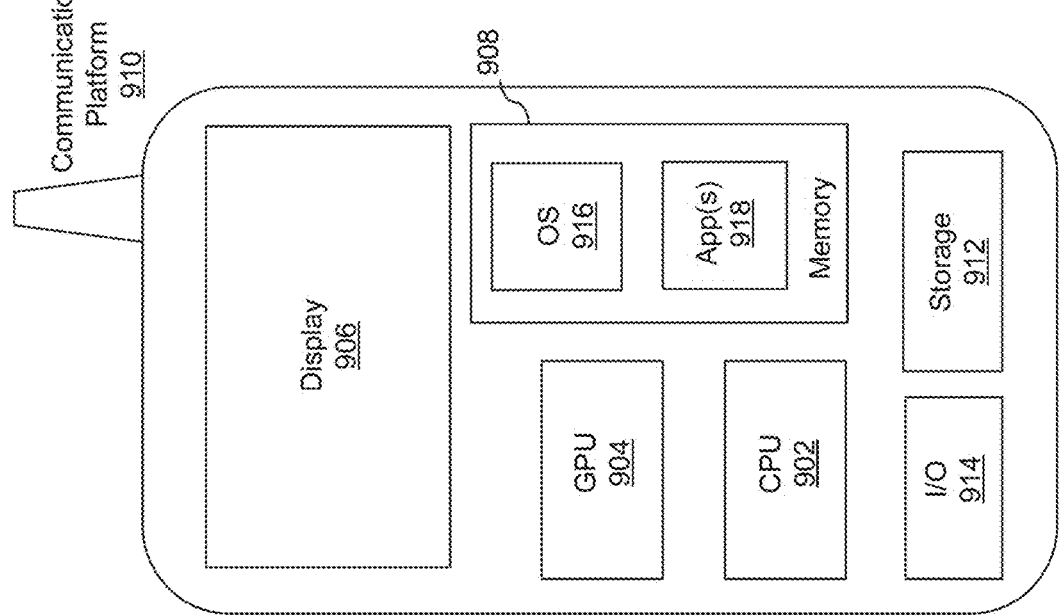
FIG. 9 depicts a general mobile device architecture on which the present teaching can be implemented.

FIG. 9 depicts a general mobile device architecture on which the present teaching can be implemented. In this example, the user device is a mobile device 900, including but not limited to, a smart phone, a tablet, a music player, a handled gaming console, a global positioning system (GPS) receiver, a smart-TV, wearable devices, etc. The mobile device 900 in this example includes one or more central processing units (CPUs) 902, one or more graphic processing units (GPUs) 904, a display 906, a memory 908, a communication platform 910, such as a wireless communication module, storage 912, and one or more input/output (I/O) devices 914. Any other suitable component, such as but not limited to a system bus or a controller (not shown), may also be included in the mobile device 900. As shown in FIG. 9, a mobile operating system 916, e.g., iOS, Android, Windows Phone, etc., and one or more applications 918 may be loaded into the memory 908 from the storage 912 in order to be executed by the CPU 902. The applications 918 may include a browser or any other suitable mobile apps for receiving user inputs and providing user interactions through the mobile device 900. Execution of the applications 918 may cause the mobile device 900 to perform the processing as described above in the present teaching. For example, presentation of a web page to the user may be made by the GPU 904 in conjunction with the display 906. Search keywords may be inputted by the user via the I/O devices 914.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

FIG. 10 depicts a general computer architecture on which the present teaching can be implemented. The computer may be a general-purpose computer or a special purpose computer. This computer can be used to implement any components of the system for providing multi-labels prediction as described herein. Different components of the systems disclosed in the present teaching can all be implemented on one or more computers such as computer, via its hardware, software program, firmware, or a combination thereof. Although only one such computer is shown, for convenience, the computer functions relating to content recommendation may be implemented in a distributed fashion on a number of similar platforms, to distribute the processing load.

The computer, for example, includes COM ports 1002 connected to and from a network connected thereto to facilitate data communications. The computer also includes a CPU 1004, in the form of one or more processors, for executing program instructions. The exemplary computer platform includes an internal communication bus 1006, program storage and data storage of different forms, e.g., disk 1008, read only memory (ROM) 1010, or random access memory (RAM) 1012, for various data files to be processed and/or communicated by the computer, as well as possibly program instructions to be executed by the CPU 1004. The computer also includes an I/O component 1014, supporting input/output flows between the computer and other components therein such as user interface elements 1016. The computer may also receive programming and data via network communications.

Hence, aspects of the methods of user profiling for recommending content, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a computing device having at least one processor, storage, and a communication platform connected to a network for predicting a next word, the method comprising:
   generating a suggestion database including a plurality of suggestions;
   receiving an input from a user including a first word and at least one character of a second word;
   obtaining one or more indices associated with the at least one character from the suggestion database;
   retrieving one or more suggestions for the second word from each of the one or more indices based on a frequency with which each of the one or more suggestions for the second word were previously retrieved for one or more other users to determine a ranking of the retrieved one or more suggestions for the second word;
   determining at least one suggestion from the one or more suggestions based on a measure with respect to the first word and each of the one or more suggestions and the ranking; and
   providing the at least one suggestion to the user for presentation.

2. The method of claim 1, wherein generating the plurality of suggestions further comprises:
   obtaining training data related to content suggestions;
   generating a plurality of strings based on the training data, each of the plurality of strings comprising at least two words of suggestion;
   expanding a last word of each of the plurality of strings to obtain a set of items, wherein each item of the set of item is a partial prefix of the last word; and
   predicting one or more next words based on the set of items, each of the one or more next words being a suggestion of the last word.

3. The method of claim 2, wherein predicting the one or more next words based on the set of items further comprises:
   predicting one or more candidate words that match the partial prefixes of the last word;
   ranking the one or more candidate words based on at least a first criteria; and
   filtering the one or more ranked candidate words based on a predetermined threshold to generate the one or more next words.

4. The method of claim 2, wherein a dimension of the set of items is equal to a number of characters of the last word, and each item of the set of items has one character more than a previous item in the set of items.

5. The method of claim 2, further comprising:
   generating an index for each of the one or more next words;
   generating a prefix tree for each of the plurality of strings comprising partial prefixes of the last word; and
   storing the index for each of the one or more next words and the prefix trees in the suggestion database.

6. The method of claim 5, further comprising:
   associating additional information with each of the one or more next words; and
   storing the additional information with the one or more next words in the suggestion database.

7. The method of claim 1, wherein the ranking of the retrieved one or more suggestions for the second word is determined based on the measure, and wherein determining the at least one suggestion from the one or more suggestions comprises:
   selecting the at least one suggestion from the ranked one or more suggestions based on the measure, wherein the measure comprises a frequency with which a second word corresponding to a given suggestion of the one or more suggestions is recommended with the first word.

8. A system having at least one processor, storage, and a communication platform for predicting a next word comprising:
   a suggestion database generating engine implemented on the at least one processor and configured to generate a suggestion database including a plurality of suggestions;
   a user interface implemented on the at least one processor and configured to receive an input from a user including a first word and at least one character of a second word;
   an index retriever implemented on the at least one processor and configured to obtain one or more indices associated with the at least one character from the suggestion database;
   a suggestion retriever implemented on the at least one processor and configured to:
      retrieve one or more suggestions for the second word from each of the one or more indices from the suggestion database based on a frequency with which each of the one or more suggestions for the second word were previously retrieved for one or more other users to determine a ranking of the retrieved one or more suggestions for the second word, and
      determine at least one suggestion from the one or more suggestions based on a measure with respect to the first word and each of the one or more suggestions and the ranking; and
   a presenting module implemented on the at least one processor and configured to provide the at least one suggestion to the user for presentation.

9. The system of claim 8, wherein the suggestion database generating engine further comprises:
   a string builder configured to:
      obtain training data related to content suggestions, and
      generate a plurality of strings based on the training data, each of the plurality of strings comprising at least two words of suggestion;
   a word expanding module configured to expand a last word of each of the plurality of strings to obtain a set of items, wherein each item of the set of item is a partial prefix of the last word; and
   a next word predicting module configured to predict one or more next words based on the set of items, each of the one or more next words being a suggestion of the last word.

10. The system of claim 9, wherein:
    the next word predicting module is further configured to predict one or more candidate words that match the partial prefixes of the last word, and the suggestion database generating engine further comprises:
a ranking module configured to rank the one or more candidate words based on at least a first criteria; and
a filtering module configured to filter the one or more ranked candidate words based on a predetermined threshold to generate the one or more next words.

11. The system of claim 9, wherein a dimension of the set of items is equal to a number of characters of the last word, and each item of the set of items has one character more than a previous item in the set of items.

12. The system of claim 9, further comprising:
a suggestion generating module configured to generate the plurality of suggestions based on the one or more next words, wherein the suggestion generating module further comprises:
an indexing unit configured to generate an index for each of the one or more next words;
a prefix tree generating unit configured to generate a prefix tree for each of the plurality of strings comprising partial prefixes of the last word; and
a storing unit configured to store the index for each of the one or more next words and the prefix trees in the suggestion database.

13. The system of claim 12, wherein the suggestion generating module further comprises:
a suggestion associating unit configured to associate additional information with each of the one or more next words; and
the storing unit is further configured to store the additional information with the one or more next words in the suggestion database.

14. The system of claim 8, further comprising:
a ranking module configured to determine the ranking of the retrieved one or more suggestions based on the measure, wherein the at least one suggestion being determined from the one or more suggestions comprises the at least one suggestion being selected from the ranked one or more suggestion based on the measure, wherein the measure comprises a frequency with which a second word corresponding to a given suggestion of the one or more suggestions is recommended with the first word.

15. A non-transitory machine-readable medium having information recorded thereon for predicting a next word, when read by the machine, causes the machine to perform operations comprising:
generating a suggestion database including a plurality of suggestions;
receiving an input from a user including a first word and at least one character of a second word;
obtaining one or more indices associated with the at least one character from the suggestion database;
retrieving one or more suggestions for the second word from each of the one or more indices from the suggestion database based on a frequency with which each of the one or more suggestions for the second word were previously retrieved for one or more other users to determine a ranking of the retrieved one or more suggestions for the second word;
determining at least one suggestion from the one or more suggestions based on a measure with respect to the first word and each of the one or more suggestions and the ranking; and
providing the at least one suggestion to the user for presentation.

16. The medium of claim 15, wherein the operations further comprise:
obtaining training data related to content suggestions;
generating a plurality of strings based on the training data, each of the plurality of strings comprising at least two words of suggestion;
expanding a last word of each of the plurality of strings to obtain a set of items, wherein each item of the set of item is a partial prefix of the last word; and
predicting one or more next words based on the set of items, each of the one or more next words being a suggestion of the last word.

17. The medium of claim 16, wherein the operations further comprise:
predicting one or more candidate words that match the partial prefixes of the last word;
ranking the one or more candidate words based on at least a first criteria; and
filtering the one or more ranked candidate words based on a predetermined threshold to generate the one or more next words.

18. The medium of claim 16, wherein a dimension of the set of items is equal to a number of characters of the last word, and each item of the set of items has one character more than a previous item in the set of items.

19. The medium of claim 16, wherein the operations further comprise:
generating an index for each of the one or more next words;
generating a prefix tree for each of the plurality of strings comprising partial prefixes of the last word; and
storing the index for each of the one or more next words and the prefix trees in the suggestion database.

20. The medium of claim 16, wherein the operations further comprise:
associating additional information with each of the one or more next words; and
storing the additional information with the one or more next words in the suggestion database.

* * * * *